United States Patent [19]

Yamazaki

[11] 3,816,334
[45] June 11, 1974

[54] LIQUID CRYSTALS STABLE AGAINST ELECTROLYTIC DECOMPOSITION AND DISPLAY DEVICE UTILIZING SAME

[75] Inventor: Yoshio Yamazaki, Shimosuwa-machi, Japan

[73] Assignee: Kabushiki Kaisha Suwa Seikosha, Tokyo, Japan

[22] Filed: Sept. 27, 1971

[21] Appl. No.: 184,167

[30] Foreign Application Priority Data
Sept. 28, 1970  Japan.............................. 45-84524
Dec. 8, 1970   Japan............................ 45-108131
Dec. 29, 1970  Japan............................ 45-128121
Feb. 3, 1971   Japan................................ 46-3768
Mar. 25, 1971  Japan.............................. 46-16879

[52] U.S. Cl. ............ 252/408, 23/230 LC, 260/206, 260/207.1, 350/160
[51] Int. Cl. .............................................. C09k 3/02
[58] Field of Search ......... 260/206, 207.1; 252/408; 23/230 LC

[56] References Cited
UNITED STATES PATENTS
3,413,225  11/1968  Dmuchousky et al. ...... 252/206 UX
3,675,897  7/1972   Rafuse ............................... 252/408
3,690,745  9/1972   Jones ............................. 252/408 X

OTHER PUBLICATIONS

Russian Chemical Reviews, Sept. 1963, pages 495–500, Vol. 32, No. 9.
Brown – "Liquid Crystals & Some of Their Applications in Chemistry," Analytical Chem., Vol. 41, No. 13, Nov. 1969.
Gray – "Molecular Structure & Properties of Liquid Crystals, " Academic Press, 1962, pages 125–133.

*Primary Examiner*—Mayer Weinblatt
*Attorney, Agent, or Firm*—Blum Moscovitz Friedman & Kaplan

[57] ABSTRACT

Liquid crystals stable against electrolytic attack, and, in particular, hydrolysis, have two aromatic nuclei linked through an azo grouping. One of the rings is substituted in the para position with an alkyl group, and the other is substituted in the para position with an alkoxyl or an acyloxy group. These materials resist electrolytic attack even in the presence of small quantities of water. Compositions having a mesomorphic range including or somewhat above room temperature are disclosed. An electro-optical display device utilizing such liquid crystal composition is described.

17 Claims, No Drawings

PATENTED JUN 11 1974 3,816,334
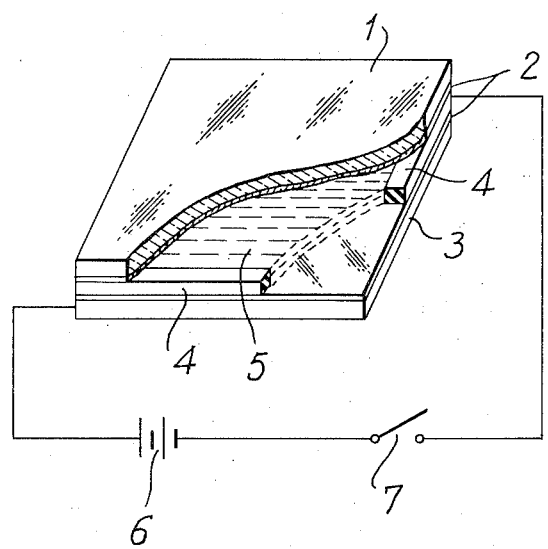

LIQUID CRYSTALS STABLE AGAINST ELECTROLYTIC DECOMPOSITION AND DISPLAY DEVICE UTILIZING SAME

BACKGROUND OF THE INVENTION

Liquid crystal materials show two transitions in the change from a solid to a liquid. At a lower transition temperature, the solid material is converted into the so-called liquid crystal state. At an upper transition temperature, the liquid crystal material is converted from the liquid crystal state to that of a pure liquid. Between the two transition temperatures the material is said to be in the mesomorphic state.

The utility of liquid crystal material in an electro-optical display device stems from the fact that in sufficiently thin films the material is transparent; moreover, when subjected to an electric field above a characteristic threshold value the material becomes opaque and disperses light. The dispersion is caused by the alignment of the liquid crystal molecules by the electric field.

This electro-optical effect can be used in a variety of display elements such as the display portion of an electric disk calculator or the display portion of a watch having no dial. A variety of types of nematic liquid crystals are known, but they suffer from the following defects:

1. The mesomorphic temperature range is comparatively high.
2. Application of an electric field above the threshold value results in eventual degradation of the material.

As an example, p-azoxyanisole solidifies below 117°C and has a mesomorphic range from 117°C to 134°C. This range is obviously too high for many uses. Although some of the liquid crystal compounds of the Schiff's base type have a mesomorphic range which is near room temperature or which includes room temperature, such compounds are subject to electrochemical degradation. They consequently are short-lived and therefore unsuitable for use in electro-optical display devices.

SUMMARY OF THE INVENTION

In accordance with the present invention, it has been found that a nematic liquid crystal azo compound suitable for use in a display device has the general formula

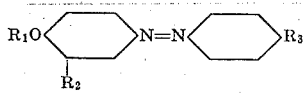

where $R_1$ is selected from the group consisting of an alkyl group having one to eight carbon atoms and an acyl group having five through 10 carbon atoms, $R_2$ is selected from the group consisting of H and $CH_3$, and $R_3$ is selected from the group consisting of $C_2H_5$, n-$C_3H_7$, and $C_4H_9$, said compound being resistant to electrochemical decomposition.

The compounds having the above structure are strongly resistant to electrochemical degradation whether by hydrolysis, reduction or oxidation. This resistance is not affected by the presence of small quantities of water introduced during synthesis. The compounds can be mixed with each other or with other nematic liquid crystal compounds to form compositions having a mesomorphic range either near room temperature or including room temperature. The materials in accordance with the present invention are synthesized by well-known methods, in good yield, and are relatively inexpensive. Furthermore, they make available bright, attractive colors ranging from light yellow through orange.

An electro-optical device utilizing compounds in accordance with the present invention is described.

Accordingly, an object of the present invention is a class of liquid crystal compounds stable against electrochemical degradation.

Another object of the present invention is a class of liquid crystal compounds having a mesomorphic range near or including room temperature.

A further object of the invention is a class of liquid crystal compounds which are low in cost.

Yet another object of the present invention is a class of liquid crystal compounds which afford a range of colors from light yellow through orange.

Yet a further object of the present invention is an electro-optical display device utilizing the liquid crystal compounds of the present invention.

Still other objects and advantages of the invention will in part be obvious and will in part be apparent from the specification.

The invention accordingly comprises compounds and compositions possessing the characteristics, properties and the relation of constituents which will be exemplified in the description hereinafter provided, and an electro-optical device for using such compounds and compositions of matter, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE shows in perspective a partially cut-away view of a device in accordance with the present invention.

DESCRIPTION OF THE PREFERRED EMBODIMENTS

The compounds of the present invention have the general formula

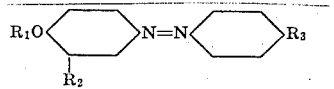

These compounds having an azo bond in the center thereof and further comprising two para-disubstituted aromatic nuclei are stable against electrolytic attack even in the presence of such small quantities of water as may remain in the composition from the synthesis procedure.

The compounds of this class may be divided into subclasses in accordance with the nature of the substituents $R_1$, $R_2$ and $R_3$. These will be described below and examples of each will be given. In addition, examples of mixtures with other nematic liquid crystal compounds will be given.

SUB-CLASS I $R_1$ is an acyl group of six, seven or eight carbon atoms, $R_2$ is H and $R_3$ is $C_2H_5$.

Table 1 gives three examples of compounds of the present sub-class and the lower transition temperatures (A) and the upper transition temperatures (B). Examples 4, 5 and 6 are liquid crystal compositions comprising materials of sub-class 1. The transition temperatures for these composition are also shown, the tabulation making it possible to discern the drop in the lower transition temperature resulting from the addition of a second liquid crystal compound.

TABLE 1

| Example | Composition | A(°C) | B(°C) | Ratio (mols) |
|---|---|---|---|---|
| 1 | p-(p'-ethylphenylazo) phenylhexanoate | 38 | 55 | — |
| 2 | p-(p'-ethylphenylazo) phenylheptanoate | 44 | 52 | — |
| 3 | p-(p'-ethylphenylazo) phenyloctanoate | 46 | 57 | — |
| 4 | mixture of p-(p'-ethylphenylazo phenylhexanoate and p-(p'-ethylphenylazo) phenylheptanoate | 30 | 50 | 2:1 |
| 5 | mixture of p-(p'-ethylphenylazo) phenylhexanoate and p-(p'-ethylphenylazo) phenyloctanoate | 28 | 54 | 3:2 |
| 6 | mixture of p-(p'-ethylphenylazo) phenylhexanoate and butyl p-(p'-ethoxyphenoxycarbonyl) phenylcarbonate | 25 | 60 | 2:1 |

As can be seen from Table 1, Example 6, it is possible to achieve a lower transition temperature of 25°C, which is very close to normal room temperature.

Generally, the nematic liquid crystals of the present subclass are made by coupling phenol to the diazonium salt of p-ethylaniline, followed by esterification with the appropriate acid. In the manufacture of these compounds, recrystallization from alcohol is repeated until each transition temperature becomes constant.

The liquid crystal materials of the present sub-class range from yellow to orange in color, this range being characteristic of azo compounds. When mixed with ester-bonded nematic liquid crystals such as butyl p-(p'-ethoxyphenoxycarbonyl) phenylcarbonate, the range of color is extended to light yellow.

SUB-CLASS II $R_1$ is an alkyl group having one to four carbon atoms, $R_2$ is $CH_3$ and $R_3$ is $C_4H_9$.

Compounds of this sub-class are prepared by coupling phenol to the diazonium salt of p-butyl aniline after which the product is converted to an ether by use of the proper alcohol. Crystallization is repeated until each phase transition temperature becomes constant.

Table 2 presents Examples 7 through 12 showing suitable mixtures employing compounds of this subclass.

TABLE 2

| Example | Composition | A(°C) | B(°C) | Ratio (mols) |
|---|---|---|---|---|
| 7 | p-(p'-methoxyphenylazo) phenylbutane | 32 | 48 | — |
| 8 | p-(p'-ethoxyphenylazo) phenylbutane | 44 | 75 | — |
| 9 | p-(p'-butoxyphenylazo) phenylbutane | | | |
| 10 | Mixture of p-(p'-methoxyphenylazo) phenylbutane and p-(p'-ethoxyphenylazo) phenylbutane | 23 | 70 | 2:1 |
| 11 | Mixture of p-(p'-ethoxyphenylazo) phenylbutane and p-ethoxybenzylidene p'-butylaniline | 18 | 72 | 1:2 |
| 12 | Mixture of p-(p'-methoxyphenylazo) phenylbutane and p-(p'-ethylphenylazo) phenylhexanoate | 10 | 50 | 1:2 |

As can be seen, mesomorphic temperature ranges including room temperature are achieved with mixtures containing members of this sub-class.

SUB-CLASS III $R_1$ is an acyl group of six, seven or eight carbon atoms, $R_2$ is $CH_3$ and $R_3$ is $C_4H_9$.

Compounds of this sub-class are made by coupling o-cresol to the diazonium salt of p-butylaniline and esterifying with the appropriate acid. Recrystallization is repeated until the phase transition temperatures become constant.

Table 3 shows Examples 15 and 16 which are compositions utilizing members of this sub-class.

TABLE 3

| Example | Composition | A(°C) | B(°C) | Ratio (mols) |
|---|---|---|---|---|
| 13 | p-(3-methyl-4-hexanoyl-oxyphenylazo) phenylbutane | 20 | 12 | — |
| 14 | 3-methyl (4-heptanoyloxyphenylazo) phenylbutane | 18 | 10 | — |
| 14A | 3-methyl (4-octanoyloxyphenylazo) phenylbutane | 15 | 10 | — |
| 15 | Mixture of 3-methyl (4-hexanoyloxy-phenylazo)phenylbutane and p-(p'-ethoxyphenoxycarbonyl) phenylcarbonate | 5 | 30 | 1:2 |
| 16 | Mixture of 3-methyl (4-hexanoyloxy-phenylazo)phenylbutane and p-(p'-ethylphenylazo) phenylhexanoate | 8 | 35 | 1:3 |

SUB-CLASS IV $R_1$ is an acyl group having between six and 10 carbon atoms, $R_2$ is H, and $R_3$ is $C_4H_9$.

Compounds of this sub-class are made by coupling phenol to a diazonium salt of p-n-butylaniline and esterifying with the appropriate acid. Recrystallization is repeated until each phase transition temperature becomes constant.

Table 4 gives the properties of Examples 17 through 20; each of Examples 22 through 25 is a mixture containing at least one member of the present sub-class. The mesomorphic temperature range of Example 24 makes it particularly suitable for use at room temperature.

TABLE 4

| Example | Composition | A(°C) | B(°C) | Ratio (mols) |
|---|---|---|---|---|
| 17 | p-(p'-hexanoyloxyphenylazo) phenylbutane | 55 | 62 | — |
| 18 | p-(p'-heptanoyloxyphenylazo) phenylbutane | 49 | 56 | — |
| 19 | p-(p'-octanoyloxyphenylazo) phenylbutane | 46 | 61 | — |
| 20 | p-(p'-nonanoyloxyphenylazo) phenylbutane | 47 | 57 | — |
| 21 | p-(p'-decanoyloxyphenylazo) phenylbutane | 51 | 62 | — |
| 22 | Mixture of p-(p'-octanoyloxyphenylazo) phenylbutane and p-(p'-nonanoyloxyphenylazo)phenylbutane | 38 | 55 | 2:1 |
| 23 | Mixture of p-(p'-heptanoyloxyphenylazo) phenylbutane and p-(p'-octanoyloxyphenylazo) phenylbutane | 40 | 54 | 1:2 |
| 24 | Mixture of p-(p'-octanoyloxyphenylazo) phenylbutane and methyl p-(p'-n-hexylphenoxycarbonyl) phenylether | 20 | 50 | 3:1 |
| 25 | Mixture of p-(p'-octanoyloxyphenylazo) phenylbutane and butyl p-(p'-ethoxyphenoxycarbonyl) phenylcarbonate | 30 | 55 | 1:1 |

SUB-CLASS V $R_1$ is an acyl group of 6, 7 or 8 carbon atoms, $R_2$ is H, and $R_3$ is n-$C_3H_7$.

Compounds of this sub-class are made by coupling phenol to a diazonium salt of p-propylaniline and coupling the product by esterification with the appropriate acid. Recrystallization is repeated until each phase transition temperature becomes constant.

Table 5 gives the transition temperatures for members of this sub-class and for mixtures containing members of this subclass. The mixtures are presented as Examples 30 through 33.

Mixtures containing members of this sub-class yield display devices showing colors ranging from light yellow to orange.

TABLE 5

| Example | Composition | A(°C) | B(°C) | Ratio (mols) |
|---|---|---|---|---|
| 26 | p-(p'-n-propylphenylazo) phenylhexanoate | 46 | 66 | — |
| 27 | p-(p'-n-propylphenylazo) phenylheptanoate | 40 | 63 | — |
| 28 | p-(p'-n-propylphenylazo) phenyloctanoate | 45 | 66 | — |
| 29 | p-(p'-n-propylphenylazo) phenylpentanoate | 49 | 62 | — |
| 30 | Mixture of p-(p'-n-propylphenylazo) phenylheptanoate and p-(p'-n-propylphenylazo) phenyloctanoate | 35 | 60 | 2:1 |
| 31 | Mixture of p-(p'-n-propylphenylazo) phenylheptanoate and p-(p'-n-propylphenylazo)phenyloctanoate and p-(p'-n-propylphenylazo) phenylhexanoate | 33 | 60 | 2:1:1 |
| 32 | Mixture of p-(p'-n-propylphenylazo) phenylheptanoate and methyl p-(p'-n-hexanoylphenoxycarbonyl) phenylether | 20 | 60 | 2:1 |
| 33 | Mixture of p-(p'-n-propylphenylazo) phenylheptanoate and butyl p-(p'-ethoxyphenoxycarbonyl) phenylcarbonate | 25 | 62 | 1:1 |

The transition points of the non-azo compounds used in some of the mixtures are given in Table 6.

TABLE 6

| Compound | A(°C) | B(°C) |
|---|---|---|
| butyl p-(p'-ethoxyphenoxycarbonyl)phenylcarbonate | 54 | 70 |
| methyl p-(p'-n-hexylphenoxycarbonyl)phenylether | 29 | 45 |
| p-methoxybenzylidene p'-n-butylaniline | 20 | 40 |
| p-methoxybenzylidene p'-n-amylaniline | 38 | 60 |
| p-n-propoxybenzylidene p'-n-amylaniline | 33 | 60 |

The single FIGURE shows a device using compounds in accordance with the present invention. Two opposing plate members 1 and 3 are separated by an insulting spacer 4. Each of the plate members 1 and 3 is coated on its interior face with a conductive layer 2. At least one of the plate members 1 and 3 must be transparent and the coating 2 thereon must also be transparent. The plate members together with the insulating spacer 4 form a sealed space 5 in which the nematic liquid crystal compositions of the present invention are enclosed. Each conductive layer 2 is connected by lead wires to power source 6 through switch 7.

When the thickness of space 5 is about 20 microns, application of a voltage between 10 and 15 V, either alternating or direct, causes the otherwise transparent liquid composition to disperse light as the result of double refraction and to become opaque.

It will thus be seen that the objects set forth above, among those made apparent from the preceding description, are efficiently attained and, since certain changes may be made in the above composition of matter without departing from the spirit and scope of the invention, it is intended that all matter contained in the above description and drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A composition consisting essentially of a first liquid crystal compound in accordance with the general formula

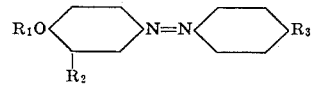

where $R_1$ is selected from the group consisting of an alkyl group having one to eight carbon atoms and an acyl group having five through 10 carbon atoms, $R_2$ is selected from the group consisting of H and $CH_3$, and $R_3$ is selected from the group consisting of $C_2H_5$, n-$C_3H_7$, and $C_4H_9$, and a second nematic liquid crystal compound, said second liquid crystal compound being included to lower the temperature of transition of said first liquid crystal compound from a solid to a liquid crystal, the mole ratio of said first to said second compound lying between 3:1 and 1:3, said second liquid crystal compound being selected from the group consisting of compounds represented by said general formula and the subgroup of compounds consisting of p-ethoxybenzylidene p'-butylaniline butyl p-(p'-ethoxyphenoxy carbonyl) phenyl carbonate, methyl p-(p'-n-hexylphenoxycarbonyl) phenyl ether, p-methoxy benzylidene p'-n-butylaniline, p-methoxy benzylidene p'-n-amylaniline and p-n-propoxybenzylidene p'-n-amylaniline, said second liquid crystal being different from said first liquid crystal.

2. The composition as defined in claim 1, wherein said first compound is p-(p'-ethylphenylazo)-phenylhexanoate and said second compound is p-(p'-ethylphenylazo)-phenylheptanoate.

3. The composition as defined in claim 1, wherein said first compound is p-(p'-ethylphenylazo)-phenylhexanoate and said second compound is p-(p'-ethylphenylazo)-phenyloctanoate.

4. The composition as defined in claim 1, wherein said first compound is p-(p'-ethylphenylazo)-phenylhexanoate and said second compound is butyl p-(p'-ethoxyphenoxycarbonyl) phenylcarbonate.

5. The composition as defined in claim 1, wherein said first compound is p-(p'-methoxyphenylazo)-phenylbutane. and said second compound is p-(p'-ethoxyphenylazo)-phenylbutane.

6. The composition as defined in claim 1, wherein said first compound is p-(p'-ethoxyphenylazo)-phenylbutane and said second compound is p-ethoxybenzylidene-p'-butylaniline.

7. The composition as defined in claim 1, wherein said first compound is p-(p'-methoxyphenylazo)-phenylbutane and said second compound is p-(p'-ethylphenylazo)-phenylhexanoate.

8. The composition as defined in claim 1, wherein said first compound is p-(3-methyl-4-hexanoyloxyphenylazo) phenylbutane and said second compound is p-(p'-ethoxyphenoxycarbonyl) phenylcarbonate.

9. The composition as defined in claim 1, wherein said first compound is p-(3-methyl-4-hexanoyloxyphenylazo) phenylbutane and said second compound is p-(p'-ethylphenylazo) phenylhexanoate.

10. The composition as defined in claim 1, wherein said first compound is p-(p'-octanoyloxyphenylazo) phenylbutane and said second compound is p-(p'-nonanoyloxyphenylazo) phenylbutane.

11. The composition as defined in claim 1, wherein said first compound is p-(p'-heptanoyloxyphenylazo) phenylbutane and said second compound is p-(p'-octanoyloxyphenylazo) phenylbutane.

12. The composition as defined in claim 1, wherein said first compound is p-(p'-octanoyloxyphenylazo) phenylbutane and said second compound is p-(p'-n-hexylphenoxycarbonyl) phenylether.

13. The composition as defined in claim 1, wherein said first compound is p-(p'-octanoyloxyphenylazo) phenylbutane and said second compound is butyl p-(p'-ethoxyphenoxycarbonyl) phenylcarbonate.

14. The composition as defined in claim 1, wherein said first compound is p-(p'-n-propylphenylazo) phenylheptanoate and said second compound is p-(p'-n-propylphenylazo) phenyloctanoate.

15. The composition as defined in claim 1, wherein said first compound is p-(p'-n-propylphenylazo) phenylheptanoate and said second compound is p-(p'-n-hexanoylphenoxycarbonyl) phenylether.

16. The composition as defined in claim 1, wherein said first compound is p-(p'-n-propylphenylazo) phenylheptanoate and said second compound is p-(p'-ethoxyphenoxycarbonyl) phenylcarbonate.

17. A composition consisting essentially of p-(p'-n-propylphenylazo) phenylheptanoate, p-(p'-n-propylphenylazo) phenyloctanoate and p-(p'-n-propylphenylazo) phenylhexanoate in a mole ratio of approximately 2:1:1.

* * * * *